June 30, 1931.  G. J. CROWDES  1,812,686
PROCESS AND APPARATUS FOR MARKING RUBBER CORDS AND CABLES
Filed May 8, 1929
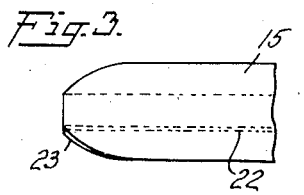
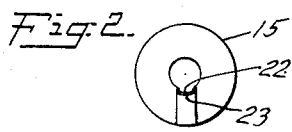
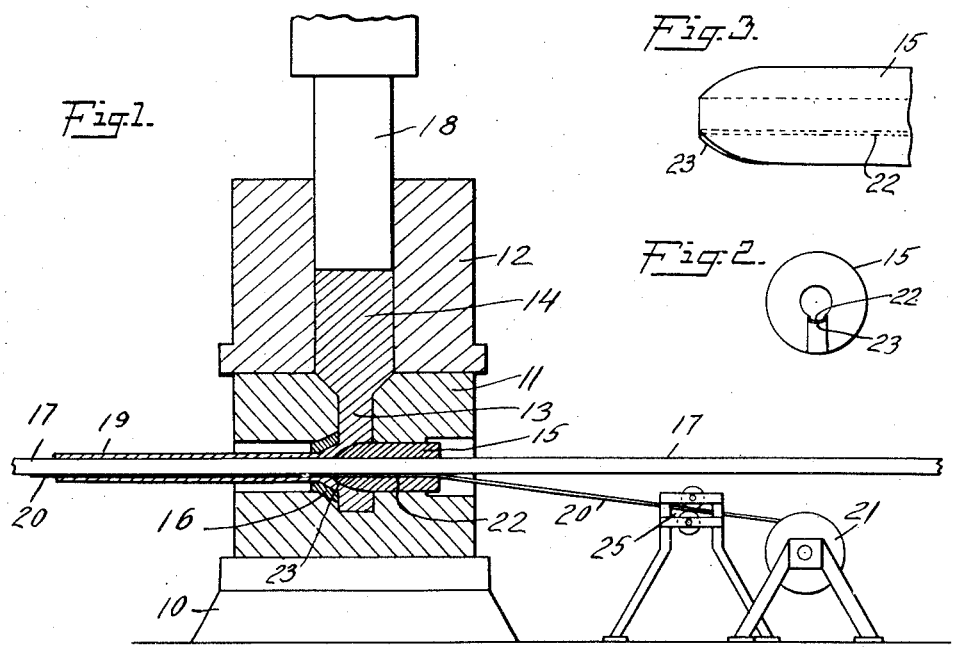
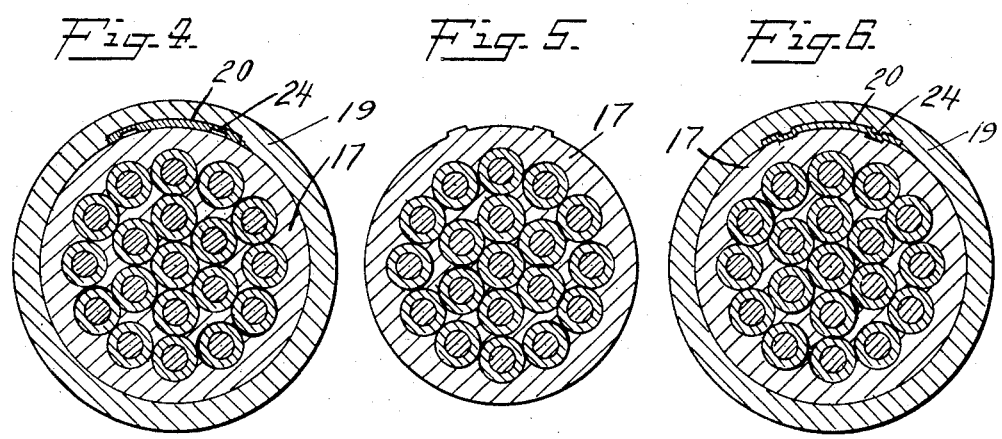
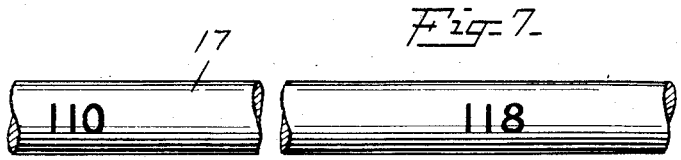
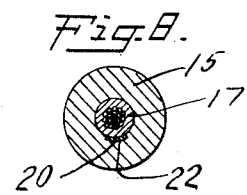
INVENTOR
George J. Crowdes
BY
Pennie Davis Marvin + Edmonds
ATTORNEYS Patented June 30, 1931

1,812,686

UNITED STATES PATENT OFFICE

GEORGE JACKSON CROWDES, OF DORCHESTER, MASSACHUSETTS, ASSIGNOR TO SIMPLEX WIRE AND CABLE COMPANY, OF BOSTON, MASSACHUSETTS, A CORPORATION OF MASSACHUSETTS

PROCESS AND APPARATUS FOR MARKING RUBBER CORDS AND CABLES

Application filed May 8, 1929. Serial No. 361,318.

This invention relates to improvements in the marking of vulcanized rubber covered cords and cables, vulcanized rubber hose, and similar goods.

The marking of such goods in a permanent manner is frequently desirable for any of a variety of reasons, identification of the maker or owner or precise identification of the goods for example. The common method of making such goods involves jacketing of the unvulcanized rubber element in a lead jacket, vulcanization of the jacketed rubber element within the lead jacket and stripping of the lead jacket from the vulcanized rubber element. The application of the lead jacket to the unvulcanized rubber element is commonly carried out by passing the rubber element successively through a male and a female die and jacketing the rubber element with lead extruded betwen the two dies by means of high pressure. A number of schemes for marking goods so made involving the application of marking devices to the rubber element passing through the male die have hitherto been used but these schemes, as hitherto used, have involved objectionable disturbance or deformation of the rubber element and many of them have materially increased the expense of the operation.

One commonly used scheme involves the impressing of metal marking tags into the rubber element passing through the male die so that these tags are encased within the lead jacket as part of the rubber element. Another commonly used scheme involves the impressing of an asbestos tape carrying metal marking tags at regular intervals into the rubber element passing through the male die so that the tape and tags are encased within the lead jacket as part of the rubber element. As will be apparent, both of these schemes involve serious displacement of the rubber element at the point of application of the marking device; this displacement is particularly serious in the case of cords or cables with but a thin rubber covering or in the case of rubber hose with thin walls for example. Such disadvantages limit the usefulness of such marking schemes, making them wholly useless in some cases.

According to the present invention, a continuous marking element is embodied in the lead jacket as it is applied to the rubber element but so that the marking element becomes a part of the lead jacket instead of a part of the rubber element. This is accomplished by providing a grove in the interior passage through the male die adapted to receive a continuous marking ribbon and to hold this ribbon in position against the rubber element as the latter passes from the male die through the female die in the jacket forming mechanism and a corresponding external projection on the male die adapted to form a groove in the lead jacket corresponding in cross-section to that of the marking ribbon. The marking ribbon advantageously is of the same material, lead, as the jacket to eliminate any special handling of the composite jacket following vulcanization.

A number of advantages are thus secured. Disturbance or deformation of the rubber element is avoided or reduced to a minimum. Rubber elements of practically any rubber-thickness may be so marked. The rubber element may be marked regularly at any desired interval. The scheme is of general application to different types of rubber elements. The marking operation is simple and economical.

The invention includes the marking method and apparatus for carrying out the marking method.

The invention will be further described in connection with the accompanying drawings which illustrate apparatus embodying the invention and adapted for carrying out the invention. It will be understood that the general type of jacket forming mechanism illustrated is well known and, for this reason and in the interest of clarity, only those details pertaining particularly to the invention are particularly described and illustrated, the drawings being diagrammatic in other respects. In the accompanying drawings:

Fig. 1 is a sectional elevation of the jacket forming mechanism showing particularly the relation of the jacket forming dies.

Fig. 2 is an end view of the male die of the jacket forming mechanism,

Fig. 3 is a section on line 3—3 of Fig. 2,
Fig. 4 is a cross-section of a rubber element and encasing lead jacket after passing through the jacket forming mechanism,
Fig. 5 is a cross-section of a rubber element following vulcanization and stripping of the lead jacket,
Fig. 6 is a cross-section, similar to Fig. 2, including a marking ribbon adapted to form an indented instead of an elevated mark,
Fig. 7 is a fragment of a rubber element showing marks applied by the invention to indicate the length of the rubber element, and
Fig. 8 is a cross-section through the male die of the jacket forming mechanism with a rubber element and marking ribbon in position therein.

Referring to the drawings, the base 10 supports an element 11 including a die chamber 13 and a superimposed element 12 including a supply chamber 14 for the jacketing lead. The male die 15 projects into the die chamber 13 in alignment with the female die 16 but spaced therefrom. The male die is provided with an interior passage adapted to receive the rubber element 17, this passage being of smaller diameter than the passage through the female die. The annulus defined by the difference in diameter of the passages through the two dies defines the lead jacket 19 formed on the rubber element in passing through the mechanism, solid lead being extruded between the female die and the male die around the rubber element as the latter passes through the female die from the male die by means of forcing means 18, usually a hydraulic ram. So far, this paragraph describes a conventional jacket forming mechanism.

Referring particularly to this invention, a marking ribbon 20 carrying marking means 24, supplied from spool 21, is passed through the groove 22 in the male die 15 with the rubber element passing through the interior passage through the male die. With respect to the rubber element, the marking ribbon forms a part of the wall of the interior passage through the male die, the groove 22 being adapted to receive the marking ribbon and to so position the marking ribbon with respect to the rubber element. As the marking ribbon and the rubber element pass from the male die through the die chamber 13 and thence through the female die 16, the marking ribbon forms a part of the wall of the interior of the lead jacket formed on the rubber element, a corresponding groove being formed in the lead jacket by means of the projection 23. The marking ribbon is held in position against the rubber element, in passing through the die chamber 13, by the coaction of the groove 22 in the male die and the pressure of the lead in the die chamber. On vulcanization of the jacketed rubber element, the marks formed by the marking means 23 are made a permanent part of the rubber element, and the marking ribbon and the lead jacket are then stripped from the vulcanized rubber element. The marking means 24 may be formed on or in the marking ribbon before it is supplied to the operation or they may be formed on or in the marking ribbon by passing a blank ribbon from spool 21 over a marking wheel on its way to the jacket forming mechanism, for example. The marking ribbon may be shaped to conform to the exterior of the rubber element by means of wheels 25. The groove 22 and the projection 23 should conform to the shape of the marking ribbon as applied to the rubber element.

As noted, the marking ribbon is advantageously of lead. Other materials adapted to retain marking means thereon are also useful in carrying out the invention. Suitable paper or fabric tapes, for example, may be used as marking ribbons. The marking means may consist of depressions or elevations on the marking ribbon or of perforations in the marking ribbon.

Lead or lead alloys are the most commonly used jacketing materials and lead jacketing materials are therefore referred to more particularly herein. Other plastic metals equivalent in the operation of the jacket forming mechanism are the equivalent of lead with respect to this invention.

Particular reference has also been made herein to rubber elements, rubber covered cords and cables and rubber hose and similar goods, because the invention is of special application in the marking of such goods. The invention is, however, generally useful in connection with the marking of similar goods of other materials convertible by means of vulcanization from a plastic to an elastic state.

I claim:

1. In the marking of rubber covered cords, cables, rubber hose and similar goods, the improvement which comprises forming a lead jacket on the rubber element with a groove in the inner side thereof and a marking ribbon therein, vulcanizing the jacketed rubber element and stripping the jacket from the vulcanized marked rubber element.

2. In the marking of rubber covered cords, cables, rubber hose and similar goods, the improvement which comprises forming a lead jacket on the rubber element with a groove in the inner side thereof and a marking ribbon of substantially the size of the groove therein, vulcanizing the jacketed rubber element and stripping the jacket from the vulcanized marked rubber element.

3. In the marking of rubber covered cords, cables, rubber hose and similar goods, the improvement which comprises forming a lead jacket on the rubber element with a marking ribbon embedded in the inner side of the lead jacket, vulcanizing the jacketed rubber element and stripping the jacket from the vulcanized marked rubber element.

4. In the marking of rubber covered cords, cables, rubber hose and similar goods, the improvement which comprises extruding a lead jacket around the rubber element, forming a groove in the inner side of the lead jacket as said jacket is extruded around the rubber element, placing a marking ribbon of substantially the size of the said groove in said groove during the extrusion of the jacket, vulcanizing the jacketed rubber element and stripping the jacket from the vulcanized marked rubber element.

5. In combination with apparatus for jacketing and marking rubber covered cords and cables, rubber hose and similar goods for vulcanization comprising male and female dies, means for extruding metal between the dies and means for passing the rubber element successively through the interior passage of the male die and the female die, means for supplying a continuous marking ribbon to the interior passage through the male die with the rubber element, and a groove in the interior passage through the male die adapted to receive said marking ribbon.

6. In combination with apparatus for jacketing and marking rubber covered cords and cables, rubber hose and similar goods for vulcanization comprising male and female dies, means for extruding metal between the dies and means for passing the rubber element successively through the interior passage of the male die and the female die, means for supplying a continuous marking ribbon to the interior passage through the male die with the rubber element, and a groove in the interior passage through the male die adapted to receive said marking ribbon and a corresponding projection on the male die.

In testimony whereof I affix my signature.

GEORGE JACKSON CROWDES.